US008164454B2

(12) United States Patent
Teller

(10) Patent No.: US 8,164,454 B2
(45) Date of Patent: Apr. 24, 2012

(54) ID PROXIMITY MONITORING OF INVENTORY OBJECTS

(75) Inventor: David Teller, Mill Valley, CA (US)

(73) Assignee: Beverage Metrics Holding Ltd., Baar (CH)

( * ) Notice: Subject to any disclaimer, the term of this patent is extended or adjusted under 35 U.S.C. 154(b) by 294 days.

(21) Appl. No.: 11/923,310

(22) Filed: Oct. 24, 2007

(65) Prior Publication Data

US 2008/0094211 A1    Apr. 24, 2008

Related U.S. Application Data

(60) Provisional application No. 60/854,117, filed on Oct. 24, 2006.

(51) Int. Cl.
| | | |
|---|---|---|
| G08B 13/14 | (2006.01) | |
| H04Q 5/22 | (2006.01) | |
| G06G 1/14 | (2006.01) | |
| G06F 19/00 | (2011.01) | |
| G06F 7/00 | (2006.01) | |
| G01C 9/00 | (2006.01) | |

(52) U.S. Cl. ............... 340/572.1; 340/10.1; 340/539.11; 340/572.4; 340/689; 705/22; 235/385; 700/237; 702/150

(58) Field of Classification Search .................. None
See application file for complete search history.

(56) References Cited

U.S. PATENT DOCUMENTS

| | | |
|---|---|---|
| 3,170,597 A | 2/1965 | Reichenberger |
| 3,706,176 A | 12/1972 | Leatherman |
| 3,920,149 A | 11/1975 | Fortino et al. |
| 4,158,624 A | 6/1979 | Ford et al. |
| 4,168,410 A | 9/1979 | Norris |
| 4,278,186 A | 7/1981 | Williamson |
| 4,409,649 A | 10/1983 | Heeger |
| 4,419,016 A | 12/1983 | Zoltan |
| 4,433,795 A | 2/1984 | Maiefski et al. |
| 4,494,656 A | 1/1985 | Shay et al. |
| 4,660,742 A | 4/1987 | Ozdemir |
| 4,695,954 A | 9/1987 | Rose et al. |
| 4,736,871 A | 4/1988 | Luciani et al. |
| 4,884,212 A | 11/1989 | Stutsman |
| 4,944,337 A | 7/1990 | Credle, Jr. et al. |
| 4,961,533 A | 10/1990 | Teller et al. |
| 4,970,811 A | 11/1990 | Chang |
| 4,978,946 A | 12/1990 | Nordholm et al. |
| 5,042,686 A | 8/1991 | Stucki |
| 5,044,521 A | 9/1991 | Peckels |

(Continued)

FOREIGN PATENT DOCUMENTS

WO    8101506 A1    6/1981

(Continued)

*Primary Examiner* — Jennifer Mehmood
*Assistant Examiner* — Fekadeselassie Girma
(74) *Attorney, Agent, or Firm* — Roberts, Mlotkowski, Safran & Cole, P.C.

(57) ABSTRACT

ID proximity systems and methods for monitoring a movement of an object. A method comprises the steps of: using a second transponder to receive data transmitted by a first transponder attached to the object; and modifying the data based on at least one characteristic of the second transponder, wherein the second transponder is situated within a predetermined distance from the first transponder. The second transponder modifies the data by adding an identifier that corresponds to an operator. The second transponder may be worn by the operator.

6 Claims, 7 Drawing Sheets

U.S. PATENT DOCUMENTS

| | | | |
|---|---|---|---|
| 5,053,607 A | 10/1991 | Carlson et al. |
| 5,091,713 A | 2/1992 | Horne et al. |
| 5,115,888 A | 5/1992 | Schneider |
| 5,158,793 A | 10/1992 | Helbing |
| 5,255,819 A | 10/1993 | Peckels |
| 5,318,197 A | 6/1994 | Martindale et al. |
| 5,350,082 A | 9/1994 | Kiriakides, Jr. et al. |
| 5,372,054 A | 12/1994 | Federighi, Sr. |
| 5,379,916 A | 1/1995 | Martindale et al. |
| 5,505,349 A | 4/1996 | Peckels |
| 5,557,529 A | 9/1996 | Warn et al. |
| 5,566,732 A | 10/1996 | Nelson |
| 5,603,430 A | 2/1997 | Loehrke et al. |
| 5,663,887 A | 9/1997 | Warn et al. |
| D386,350 S | 11/1997 | Mogadam |
| 5,722,526 A | 3/1998 | Sharrrard |
| 5,767,775 A | 6/1998 | Shukla et al. |
| 5,826,409 A | 10/1998 | Slepicka et al. |
| 5,831,861 A | 11/1998 | Warn et al. |
| 5,854,994 A | 12/1998 | Canada et al. |
| 5,884,292 A | 3/1999 | Baker et al. |
| 5,889,676 A | 3/1999 | Kubo et al. |
| 5,930,146 A | 7/1999 | Takenaka |
| 5,930,766 A | 7/1999 | Gibb |
| 5,952,218 A | 9/1999 | Lee et al. |
| 5,969,606 A | 10/1999 | Reber et al. |
| 6,036,055 A | 3/2000 | Mogadam et al. |
| 6,053,359 A | 4/2000 | Goulet et al. |
| 6,056,108 A | 5/2000 | Buchi et al. |
| 6,056,194 A | 5/2000 | Kolls |
| 6,101,452 A | 8/2000 | Krall et al. |
| 6,105,806 A | 8/2000 | Stasiuk |
| 6,150,942 A | 11/2000 | O'Brian |
| 6,321,620 B1 | 11/2001 | Fabbro |
| 6,448,549 B1 | 9/2002 | Safaee-Rad |
| 6,564,121 B1 | 5/2003 | Wallace et al. |
| 6,606,605 B1 | 8/2003 | Kolls |
| 6,854,642 B2 | 2/2005 | Metcalf et al. |
| 6,892,166 B2 | 5/2005 | Mogadam |
| 6,933,849 B2 * | 8/2005 | Sawyer ................. 340/572.4 |
| 7,003,406 B2 | 2/2006 | Mogadam |
| 7,126,749 B2 | 10/2006 | Heim et al. |
| 7,260,504 B2 | 8/2007 | Mogadam |
| 7,272,537 B2 | 9/2007 | Mogadam |
| 7,299,981 B2 * | 11/2007 | Hickle et al. ................. 235/385 |
| 2002/0087413 A1 | 7/2002 | Mahaffy et al. |
| 2002/0107610 A1 | 8/2002 | Kaehler et al. |
| 2003/0055589 A1 | 3/2003 | Mogadam et al. |
| 2003/0057226 A1 | 3/2003 | Long |
| 2005/0151625 A1 | 7/2005 | Lai |
| 2005/0195081 A1 | 9/2005 | Studnicki et al. |
| 2007/0214055 A1 * | 9/2007 | Temko ............................ 705/22 |

FOREIGN PATENT DOCUMENTS

WO  9636950 A1  11/1996

* cited by examiner

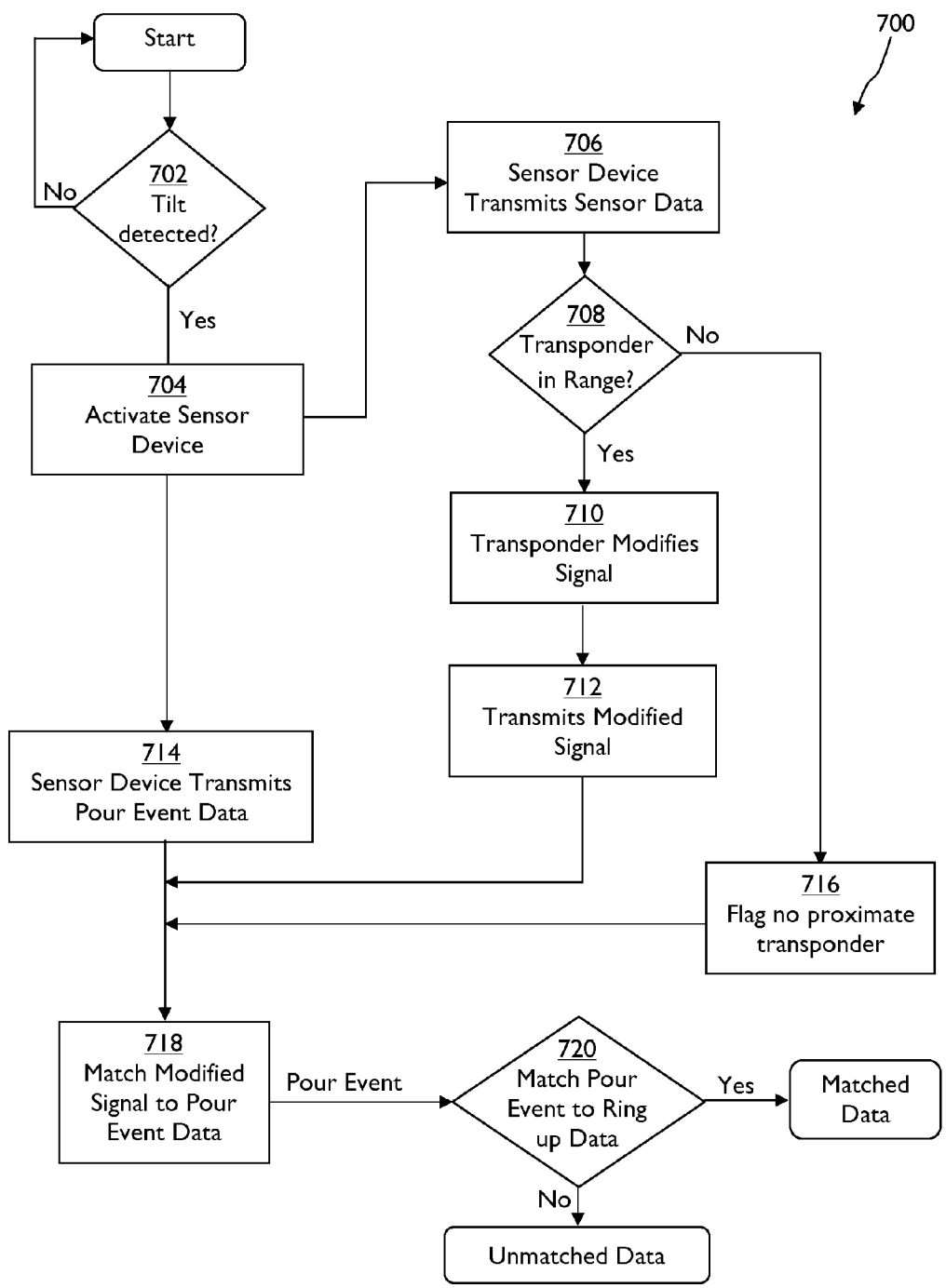

ID PROXIMITY MONITORING OF INVENTORY OBJECTS

CROSS-REFERENCE TO RELATED APPLICATIONS

This application claims priority to U.S. Provisional App. No. 60/854,117, filed on Oct. 24, 2006, the entire disclosure and contents of the above application is incorporated by reference.

BACKGROUND

1. Field of the Invention

The present invention relates generally to monitoring the movement of objects and more specifically to ID proximity monitoring when monitoring the dispensing of beverages.

2. Related Art

Establishments, such as restaurants, bars, nightclubs, lounges, hotels, etc., lose a significant amount of revenue due to pilferage at the point of sale, pilferage of bottles from the bar and storage areas and dispensing of drinks to "buddies." In addition revenue loss is also attributable to manual and error-prone methods of establishing and keeping metrics. Critical metrics such as pouring cost, pour accuracy and inventory values are calculated as infrequently as once a month, or manually on "inventory" day. The task of counting and measuring beverage inventory and calculating pouring costs is time consuming and open to intentional and unintentional errors.

Technical solutions exist that address some of the described problems. For instance multiple serving bottles can be fitted with a control or counting device in the neck of the bottle, or drinks can be dispensed through a gun or other electro/mechanical device. Other solutions include measuring the amount poured prior to serving, or weighing bottles after each serving or at the end of a shift or week. These solutions are typically used in airports and casinos where customer satisfaction takes second place to controls. Further these controlled-pour solutions require cleaning between uses.

Existing systems and methods have a negative impact on customers and on the bar aesthetic, and are therefore rejected by the vast majority of establishments. Thus, most establishments, such as casual and fine dining, choose to suffer pilferage and inefficiencies that are endemic to the industry, rather than aggravate their customers with controlled or measured pours and devices that disturb the ambiance and aesthetic of the point of sale.

SUMMARY

According to a first broad aspect of the present invention, there is provided a method for monitoring a movement of an object, the method comprising the steps of: using a second transponder to receive data transmitted by a first transponder attached to the object; and modifying the data based on at least one characteristic of the second transponder, wherein the second transponder is situated within a predetermined distance from the first transponder. The first transponder may comprise a sensor device capable of detecting a tilt or motion of the container. The first transponder may be removably attached to an operator. In one embodiment, the second transponder may modify the data by adding an identifier associated with the second transponder.

According to a second broad aspect of the present invention, there is provided a method for monitoring beverage dispensing from a container, the method comprising the steps of: receiving sensor data transmitted by a sensor device attached to the container; using at least one transponder to modify the received sensor data based on at least one characteristic of the at least one transponder, wherein the second transponder is situated within a predetermined distance from the sensor device; and determining a pour event based on pour event data received from the sensor device and the modified data, wherein the pour event data is different than the sensor data. In one embodiment, the method monitors the dispensing of a beverage from a container using the sensor device attached to the container.

According to a third broad aspect of the present invention, there is provided a system for monitoring beverage dispensing from a container comprising: a sensor device attached to the container, the sensor device being capable of transmitting a signal comprising sensor data in response to the detection of a pour event by the sensor device; a transponder configured to receive and modify the transmitted signal when the transponder is situated within a predetermined distance from the sensor device; and a base station configured to determine whether the modified signal matches pour event data sent by the sensor device, wherein the pour event data is different than the sensor data. In one embodiment, the system monitors the dispensing of a beverage from a container using the sensor device attached to the container.

BRIEF DESCRIPTION OF THE DRAWINGS

The invention will be described in conjunction with the accompanying drawings, in which:

FIG. 7 is a flowchart for processing sensor data sent from an activated sensor device in accordance with an embodiment of the present invention.

DETAILED DESCRIPTION

The present invention provides systems and methods for determining the identity of an operator associated with a movement of an object. An operator refers to a person, such as an employee, manager, clerk, stocker, bartender, waiter, waitress, etc., that moves the object. In one embodiment the object is a beverage container and the movement is the tilting of the container to dispense a beverage. In such embodiments, the linking of the operator's identity to a pour event allows such systems and methods to further match the linked pour event to independently generated ring up data based on the operator's identity.

In one embodiment, the operator's identity is determined using a transponder, which is proximate to a sensor device used to monitor the movement of an object, such as the dispensing of a beverage from a container. For purposes of the present invention, proximate refers a transponder that is situated within a predetermined distance from the sensor device. For example, proximate may refer to the area in which a transponder is capable of receiving data from the sensor device. The predetermined distance may be based on the range of the signal sent by the sensor device. The sensor device transmits a signal having a limited range, such as less than 4 feet. The operator's identity is associated with the identifier of the transponder. The transponder modifies the data received based on at least one characteristic, such as the identifier of the transponder. Such embodiments provide for combining data, in real time, from one sensor device with a selected transponder of a plurality of transponders based on proximity. The selected transponder may change depending on which of the plurality of transponders is proximate to the sensor device during the movement of the object. Systems and methods employing embodiments of the present invention may be referred to as ID proximity monitoring.

Although exemplary embodiments of the present invention will be described in terms of a beverage container as the object, other inventory objects may be used with such systems and methods. Further, embodiments of the present invention are particularly suited to alcoholic beverage containers, but such embodiments are not limited to alcoholic beverage containers and may be used with other beverage containers, such as those containers having a high cost per volume ratio.

Figure 1:
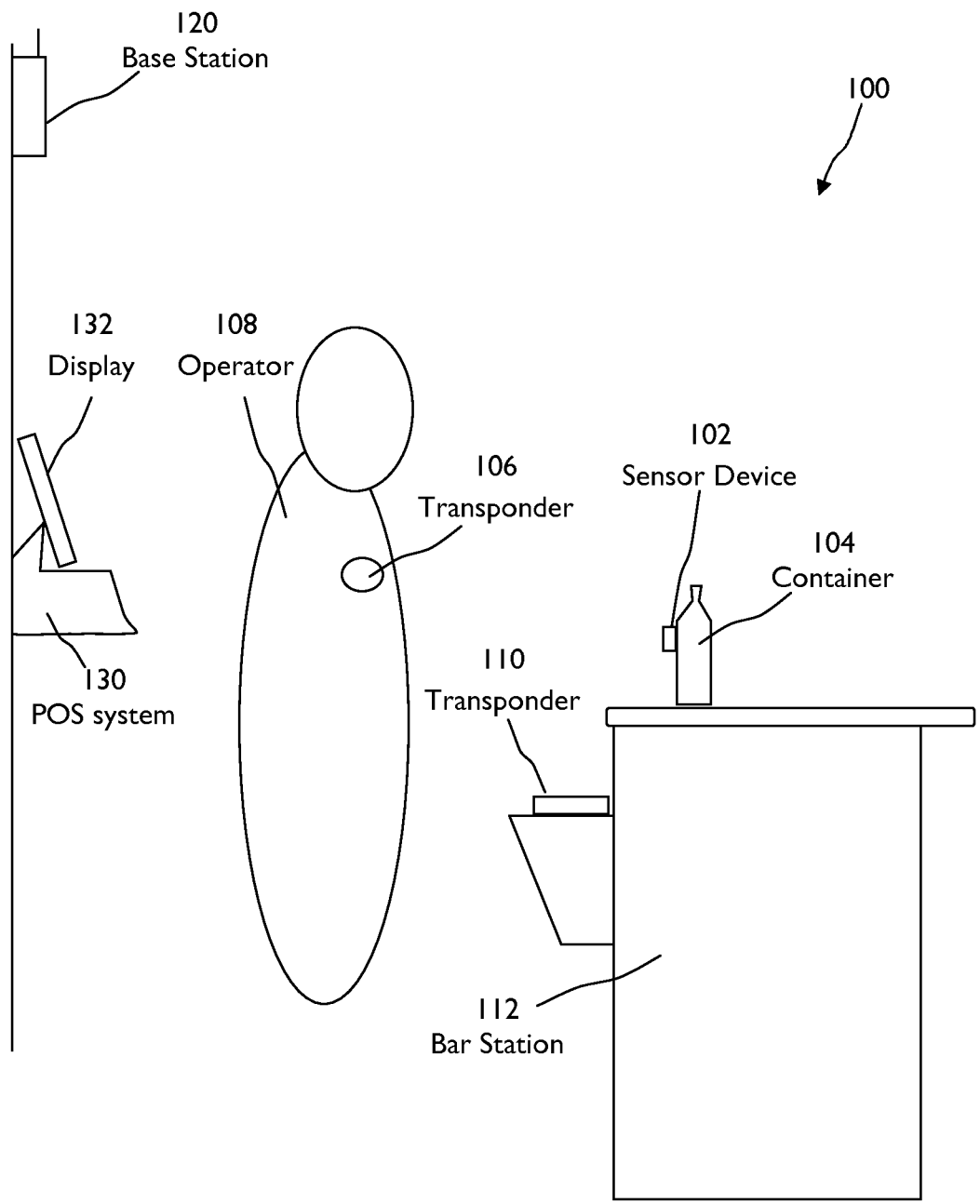
FIG. 1 illustrates components of a monitoring system employed in an establishment in accordance with an embodiment of the present invention.

FIG. 1 illustrates a monitoring system 100 employed in an establishment according to an exemplary embodiment of the present invention. Monitoring system 100 comprises a sensor device 102 attached to a container 104, a transponder 106 worn by an operator 108, a transponder 110 attached to a bar station 112, base station 120, and a point-of-sale (POS) system 130 having a display 132. Sensor device 102 communicates via communication links with transponders 106, 110, as well as via a telemetry link with base station 120. Transponders 106, 110 also communicate via communication links with base station 120. The communication links used with embodiments of the present invention may be encrypted. Although only one of each component (102-130) is shown in FIG. 1, multiple components may be used in various embodiments of the present invention. Alternatively, some embodiments may not employ each component shown in FIG. 1. For example, in one embodiment, monitoring system 100 may include a plurality of transponders 106 on a plurality of operators 108 and no transponders 110 on bar station 112. In addition, additional components not shown in FIG. 1 may be included in monitoring system 100, such as cameras, scales, local computers, other data receivers, etc. Such embodiments allow system 100 to be scalable and expandable.

Sensor device 102 used with embodiments of the present invention may be a contactless sensor such as those described in U.S. Pat. Nos. 6,504,481, 7,196,624, 7,202,780, and 7,265,673, U.S. patent application Ser. No. 11/870,253, and U.S. Provisional Patent Application Nos. 60/850,261 and 60/854,117, the entire contents and disclosures of which are hereby incorporated by reference. A contactless sensor device 102 is attached to container 104 such that the flow of the beverage from the container 104 does not contact the sensor device 102 when poured. Typically such contactless sensor devices 102 will be attached to the neck, side, or bottom of the container. Other types of sensor devices may include valve control sensors, which regulate the flow of the beverage through a valve port. The sensor device may also be integrated with free pour devices, such as Posi-Pour™ I, II, and 2000 and Liquor Saver 2000 by Magnuson Industries, Inc. Such free pour devices may use a ball bearing valve to regulate portions dispensed by a bottle. Sensor device 102 may also be integrated with monitoring systems such as the scale system and jigger described in U.S. application Ser. No. 11/428,448, filed on Jul. 3, 2006, the entire contents and disclosures of which are hereby incorporated by reference.

The sensor device is capable of detecting the movement of the object to which the sensor device is attached. In one embodiment, the sensor device comprises an accelerometer that measures acceleration of the sensor device's motion. In another embodiment, the sensor device comprises a tilt sensor or inclinometer that measures the angular movement of the sensor device. The tilting may be associated with the pouring of the beverage from the container. Other embodiments may use a sensor device having an inertial instrument or sensor or similar sensor.

In one embodiment of the present invention, sensor device 102 also includes a transmitter to send a signal to one or more transponders 106, 110. The transmitter may send the signal on the same telemetry link used to communicate with base station 120. In another embodiment, the sensor device may comprise a transponder for sending the signal. Preferably, the signal emitted by sensor device 102 to one or more transponders 106, 110 is weaker than the telemetry signal sent to the base station 120. In one embodiment, sensor device 102 may emit a signal that has a range of less than 4 feet, within establishes a predetermined distance between sensor device 102 and one or more transponders 106, 110. The emitted signal may be sent from an isotropic antenna. In one embodiment, the transmitter of sensor device 102 may continuously emit a signal at regular intervals. In another embodiment, the transmitter may emit a signal once sensor device 102 is activated by moving or tilting container 104. The emitted signal may include data such as the sensor identification and a timestamp. This data may be referred to as sensor data.

Sensor device 102 may also comprise an interrogator for receiving data from one or more transponders 106, 110 within range. The interrogator may read the modified data sent back from transponders 106, 110 and forward this modified data along pour event data to base station 120. In one embodiment, the interrogator of sensor device 102 may receive a status signal from one or more transponders 106, 110. The status signal may indicate whether such transponders 106, 110 are properly functioning or if such transponders 106, 110 have been tampered.

Transponder 106, 110 may be any suitable electronic device that is capable of receiving a first signal and transmitting a second signal in response to the received first signal. In an embodiment of the present invention, transponders 106, 110 receive a first signal from sensor device 102 and transmit a second signal to base station 120. The first and second signals may be sent on different frequencies.

In one embodiment, each transponder 106, 110 is assigned to a particular operator through a lookup table stored in the base station 120 or a computer that processes the data. Transponder 106 is worn by operator and thus accompanies the operator when moving throughout the establishment. Each time operator is proximate to sensor device, transponder 106 may receive a signal from the sensor device and modify that signal. The modified signal can be used to identify the operator. Transponder 110 is attached to a bar station and generally corresponds to a particular location in the establishment. As opposed to transponder 106, transponder 110 is associated with a location. The location generally corresponds to one or more operators. For example, one side of the establishment may be assigned to one bartender, while another bartender is assigned the other side of the establishment. In one embodiment, transponder 110 may be a pad that is activated to receive the sensor data by placing an object, such as the container or glass, on the pad.

In one embodiment, establishments may have a defined area to which transponder 110 is attached. Bar station 112 shown in FIG. 1 is a type of defined area. The transponder 110 is attached to the defined area to receive signals from sensor devices within a predetermined distance. For example, the defined area may correspond to one location, such as a storage room, in the establishment. In such examples, transponder 110 may be attached to a wall in the defined area. Any signals from sensor devices 102 within a predetermined distance from the defined area may be received by transponder 110. A system using a defined area can determine which sensor devices 102 are proximate and track the movement of the sensor devices 102 in the defined area.

Exemplary transponders 106, 110 of the present invention include radio frequency identification (RFID) tags or similar communication devices. The RFID tags may be passive, active or semi-active. For example, an active tag uses a battery to power the transmission of the signal sent to an interrogator. When using a passive tag that has no internal power source, the sensor data may excite the passive tag to send a signal to an interrogator. In a RF system used with exemplary embodiments, sensor device 102 contains digital electronics to trigger transponders 106, 110 to send a RF response signal with the information from the transponder. The information from the transponder's modulated RF response may be extracted and validated by an interrogator in the base station or sensor device. In some establishment multiple compatible RF systems may be used in embodied systems and methods of the present invention.

When RFID tags are used for transponders 106, the RFID tags may be removably attached to the operator who is serving the beverage. Transponders 110 may also be removably attached to bar station 112. When removably attached, transponders 106, 110 may include a sensor for detecting when the transponders are detached. In other embodiments, either transponder 106, transponder 110, or both may be permanently fixed to operator 108 or bar station 112. For example, in one establishment transponders 110 are permanently fixed to bar station 112, while transponders 106 are removably attached to operators 106. This allows the transponders 106 to be reused for multiple operators 106 by changing the association of the transponders' identity in the lookup table or similar database.

In exemplary embodiments, base station 120 comprises an interrogator, such as a RFID reader, and base station 120 is connected to a host system, such as a local computer or administrative site. Base station 120 may be a data receiver for communicating with sensor devices 102 and transponders 106, 110. Base station 120 may comprise a computer. The interrogator of the base station 120 may detect and receive signals from transponders 106, 110 within range of base station 120. The interrogator in base station 120 may comprise an agile reader the can read different types of tags operating at different frequencies or using different methods of communication. Base station 120 may use suitable anti-collision methods to preventing signals from one transponder from interfering with signals from another transponder in the same field. In some embodiments base station 120 may match the modified sensor signals received from transponders 106, 110 with pour event data received from the telemetry link with sensor device 102.

Suitable POS systems 130 for embodied systems and methods of the present invention include cash registers having a display 132. In one embodiment, registers allow the operator to enter information regarding the transaction, referred to as ring up data, through entering means, such as keyboard, keypad, magnetic swipe card, etc. or through a touch pad or touch screen on display 132. In particular, the POS system 130 allows an operator to identify themselves by entering a code, swiping a magnetic card, scanning a biometric, etc. In one embodiment, each operator must identify themselves before using the POS system 130 by entering a password. Suitable registers have one or more communication connections for sending and receiving data. Also, the register may have a storage device for recording the ring up data. The register may be a hand held device such as a PDA, cell phone, or other similar electronic devices.

Figure 2:
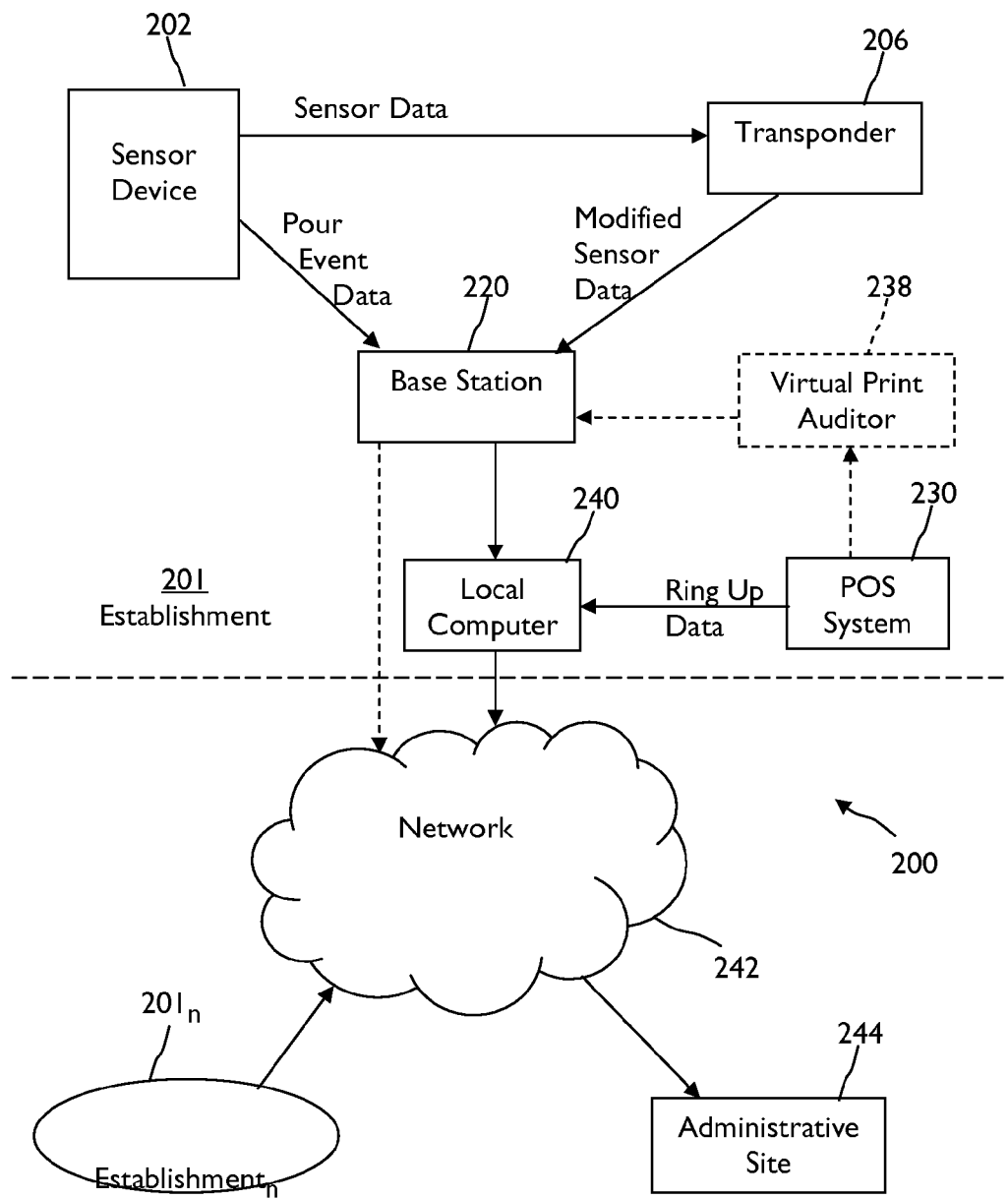
FIG. 2 is a schematic diagram of a monitoring system in accordance with an embodiment of the present invention.

Systems and methods of the present invention may be deployed in one establishment or in multiple establishments. When deployed in multiple establishments, each establishment may communicate the data gathered with a remote administrative site. FIG. 2 is a schematic diagram of multiple establishments, each at least having one or more components shown in FIG. 1, that communicate with an administrative site.

In FIG. 2 monitoring system 200 comprises a first establishment 201, additional establishments $201_n$, network 242 and administrative site 244. Network 242 connects multiple establishments 201 to administrative site 244. Network 242 may include a local area network or a wide area network, such as the Internet. First establishment 201 comprises one or more of the following sensor devices 202, transponders 206, base stations 220, POS systems 230, and local computers 240. It should be understood that additional establishments $201_n$ also comprise similar components as first establishment 201. Using first establishment 201 as an example, sensor device 202 sends sensor data to proximate transponders 206. In one embodiment, the sensor data is sent in a signal having a range of 4 feet or less. Proximate transponders 206 modify the sensor data signal by adding data, such as an operator identifier. The modified sensor data is sent to base station 220. At base station, pour event data is also received from sensor devices 202. The pour event data is matched to the modified sensor data by base station using methods of the present invention discussed in detail below. Both matched and unmatched data is sent from base station 220 to a local computer 240. Local computer 240 is also connected to one or more POS systems, which send ring up data to local computer 240.

In one embodiment, local computer 240 operates software that performs the matching of the ring up data with the pour event. The matched data is stored at administrative site 244 in a database. In another embodiment, local computer 240 sends the ring up data and pour event to administrative site 244 through network 242. Administrative site 244 comprises one or more computers or servers that operate software to match the ring up data with the pour event. The software used by any such processing device may be stored on a computer readable means, such a disk medium, CD, DVD, hard drive, etc.

In some embodiments, first establishment 201 optionally includes a virtual print auditor 238. Virtual print auditor 238 is connected to all of the POS systems 230. Virtual print auditor 238 determines ring up information by reading a virtual print out from each POS system 230. The ring up data from POS systems 230 is printed to auditor 238 and processed before sending the ring up data to base station 220. In such embodiments, base station 220 directly sends the ring up data and pour event to administrative site 244 through network 242 without a local computer 240.

Figure 3:
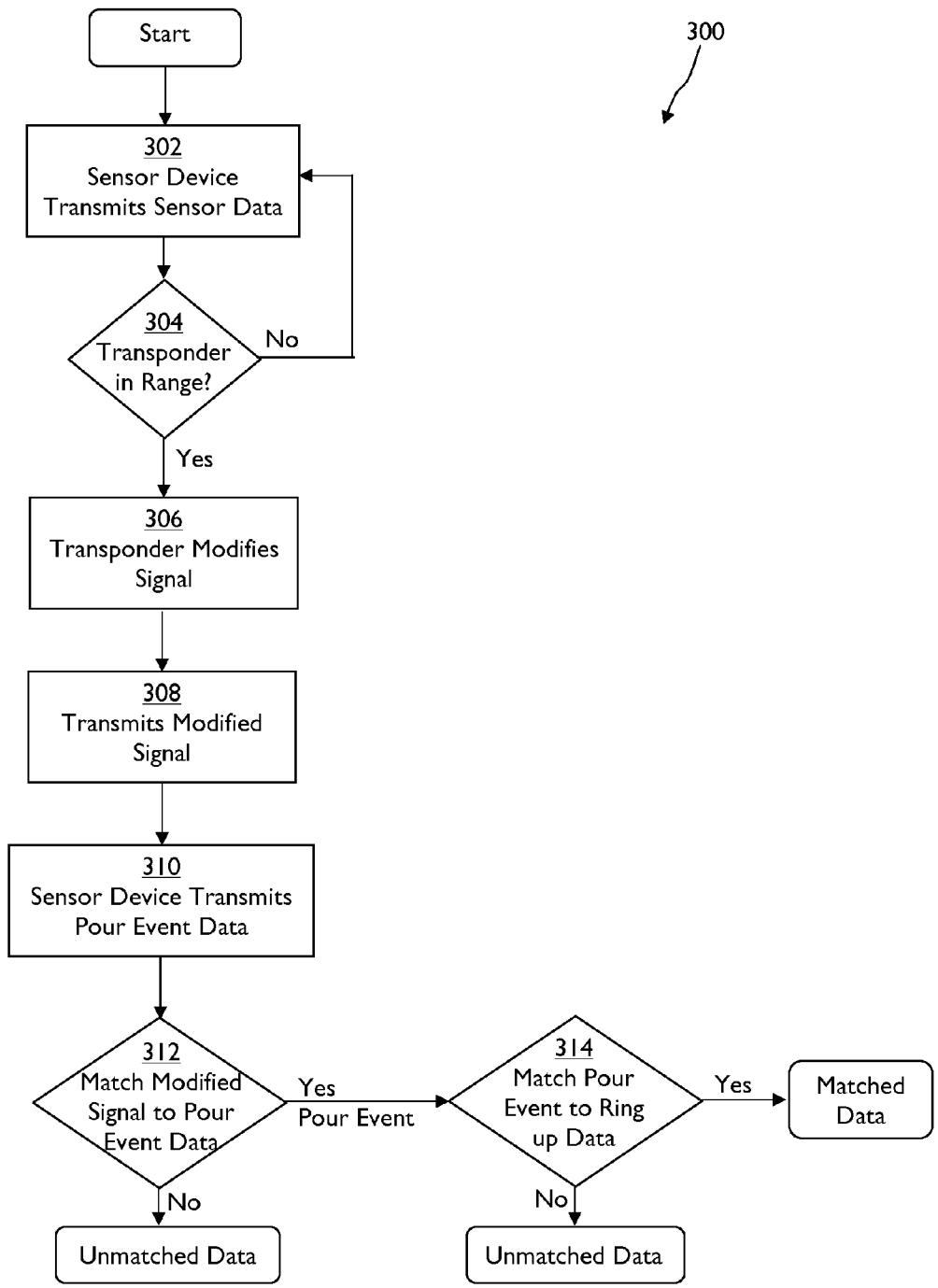
FIG. 3 is a flowchart for ID proximity monitoring in accordance with an embodiment of the present invention.

Methods using the systems described in FIGS. 1 and 2 will now be described. FIG. 3 provides a flowchart of a ID proximity monitoring method 300 of an exemplary embodiment of a first aspect of the present invention. Method 300 uses a sensor device that continuously transmits at a predetermined interval, e.g. an interval of about 5 seconds to about 5 minutes, a signal containing sensor data in 302. Sensor data comprises sensor identifier and may comprise a timestamp of when the signal is sent. Sensor identifier is an unique number assigned to a particular sensor device. The signal sent in 302 typically has a relatively weak range of less than 4 feet. In 304, a transponder that is within predetermined range of sensor device receives the signal. If no transponder receives the signal, sensor device continues to transmit signals. Once in range, transponder modifies the sensor data by adding at least one characteristic of the transponder in 306, such as an identifier. The identifier is an unique number assigned to transponder. A lookup table stored in base station or a local computer may correlate each identifier to a particular operator, i.e. bartender. This modified sensor data is transmitted by transponder in 308 to a base station.

In method 300, pour event data from sensor device is also sent in 310 and received by base station. Pour event data comprises one or more of the following: tilt time, motion time, duration of motion/tilt, sensor identifier, timestamp of transmission, brand of container, volume of amount dispensed, calculated volume amount, etc. Pour event data may be generated in response to the movement of the container to which the sensor device is attached. In one embodiment, sensor device comprises a tilt sensor for detecting a tilt of the container. In another embodiment, sensor device comprises a motion sensor for detecting a movement the container.

In 312, base station matches the modified sensor data with the pour event data. In one embodiment, this match is made using the sensor identifier. When a match can be made, a pour event is created by linking the modified sensor data and pour event data. A pour event comprises all the data from the pour event sent by the sensor device as well as the identifier sent by the transponder. Embodiments of the present invention advantageously associate each pour event, in real time, with an identifier that corresponds to an operator who was proximate to the pour event. Each of the pour events may have a different identifier depending on which operator was proximate to the pour event. Thus, the sensor device does not need to be pre-assigned to particular operator, but may be dynamically assigned to multiple operators while in use.

Pour events from 312 are sent to a server or other computer for matching with the ring up data in 314. When ring up data comprises an operator identifier, the matching may be done based on operator identifier. Additionally, the time difference or volume difference may also be considered when matching the pour events to ring up data. When pour events are matched to ring up data, the matched data is stored in a database. Unmatched data from 314 may be stored in the database to be audited at a later time by administrative site. The database provides real time inventory tracking and monitoring. In addition, various metrics can be determined from the database, such as which operators are efficient.

In one embodiment, matching pour event data to modified sensor data in 312 is performed by a base station, while matching pour events to ring up data is performed in 314 by an administrative server at an administrative site.

Unmatched data from 312 may still be sent to administrative site which may use an alternative matching scheme to reconcile the pour event data with the ring up data, such as those described in U.S. Pat. Nos. 6,504,481, 7,196,624, 7,202,780, and 7,265,673, U.S. patent application Ser. Nos. 11/428,448 and 11/870,253, and U.S. Provisional Patent Application Nos. 60/850,261 and 60/854,117, the entire contents and disclosures of which are hereby incorporated by reference.

Figure 5:
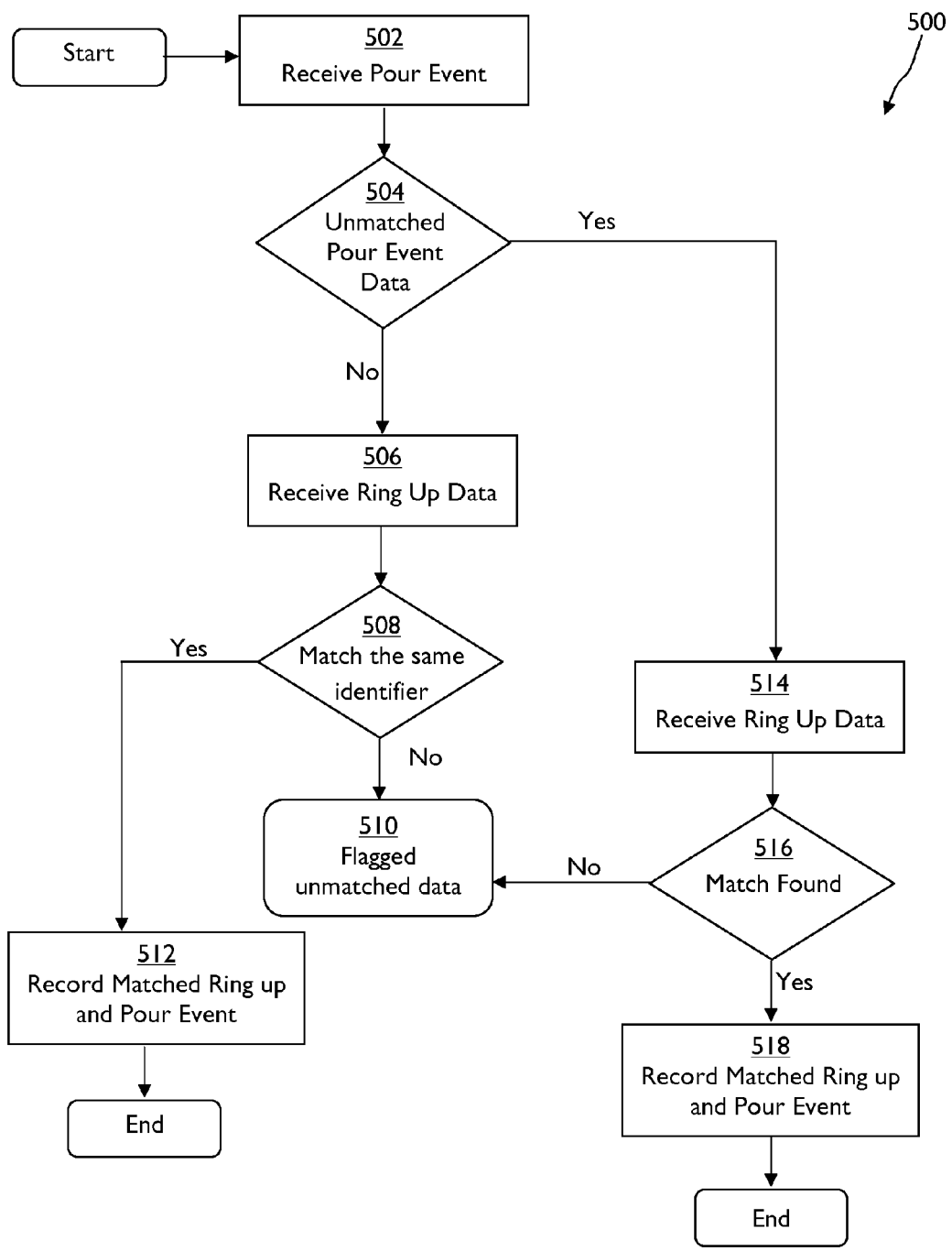
FIG. 5 is a flowchart for reconciling pour event data with ring up data in accordance with an embodiment of the present invention.
Figure 6:
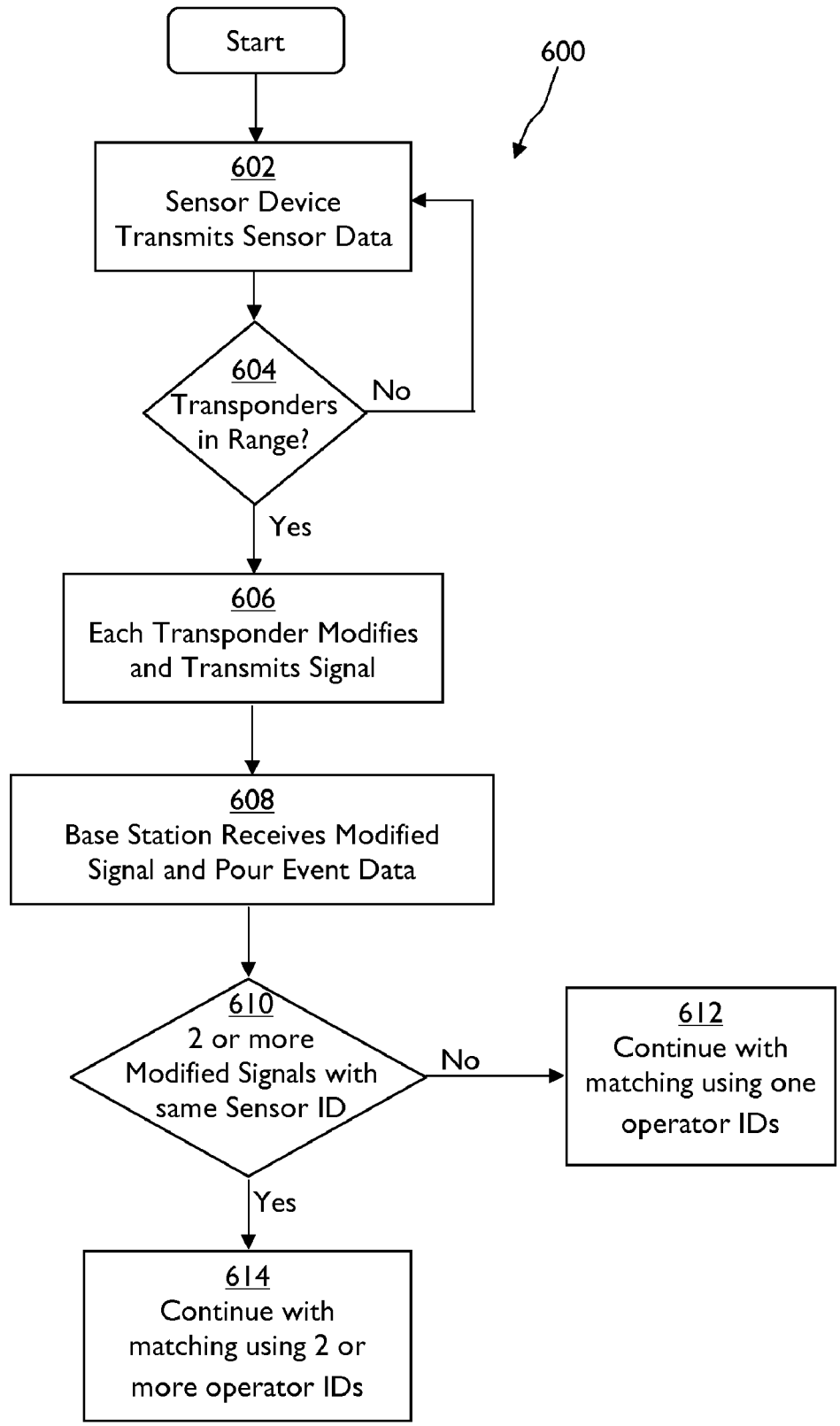
FIG. 6 is a flowchart for handling multiple responding transponders to the sensor data in accordance with an embodiment of the present invention.

ID proximity monitoring method 300 shown in FIG. 3 is top-level flowchart of embodiments of the present invention. Additional steps and processes may be added to method 300 as shown in FIGS. 4-6 and discussed below.

Figure 4:
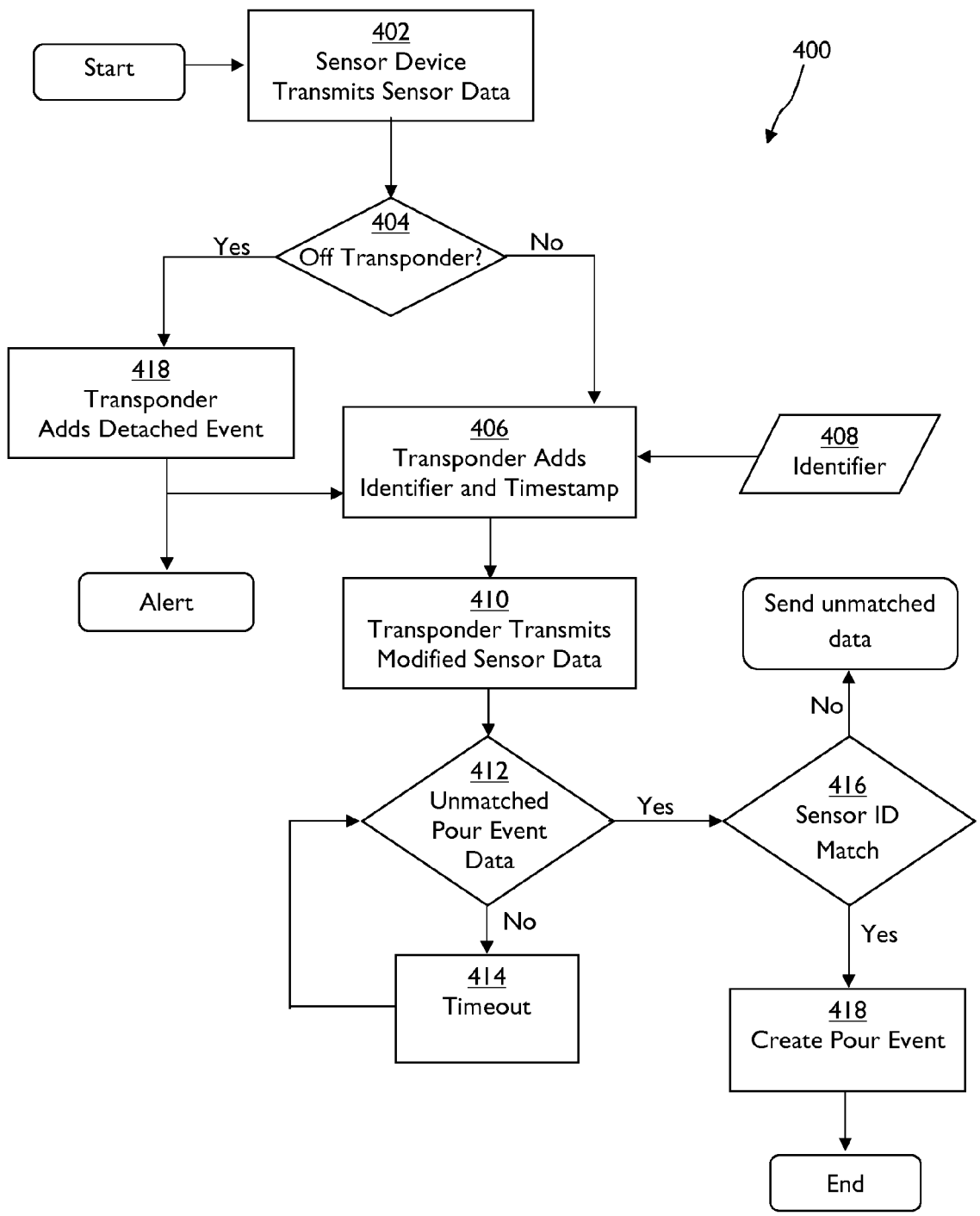
FIG. 4 is a flowchart for matching modified sensor data with pour event data in accordance with an embodiment of the present invention.

FIG. 4 is a flowchart of a method 400 used to match modified sensor data with pour event data. In 402, sensor device transmits a signal comprising sensor data to a removably attached transponder that is within range of the signal. In 404, the status of transponder is determined. If there is no status indication that the transponder was previously detached or is currently detached, method 400 proceeds to 406. In 406, transponder modifies the sensor data by adding an identifier 408 stored in transponder and a timestamp of when the sensor data was received. In 410, the modified sensor data is transmitted to the base station. The base station, which also receives pour event data, then determines if any of the pour event data is unmatched in 412. When there is no unmatched pour event data, the process times out in 414 and returns to 412 to continue waiting for unmatched pour event data. When the process times out in successive intervals, the process may end without matching the modified sensor data.

In 414, when there is unmatched pour event data, the base station matches the sensor identifier from the pour event data with a corresponding sensor identifier from the modified sensor data in 416. A pour event is created in 418 using the matched data. Method 400 ends and the pour event data may be sent to another computer or administrative site for further matching and processing. When no sensor identifier of the modified sensor data matches the pour event data in 416, the unmatched data may also be sent to another computer or administrative site for further matching and processing.

Returning to 404, if the status of the transponder indicates that the removable transponder was previously detached or is currently detached from the operator or bar station, then method 400 proceeds to 418. In 418, the transponder adds a detached event to the modified sensor data. In addition, an alert may be recorded in the database so that the matching process may determine if any other pour events may have occurred when the transponder was detached. The alert may also notify the operator to reattached the transponder using an visual or audible indication.

In embodiments that use a sensor device that continuously sends a signal comprising sensor data, the base station may receive a significant amount of unmatched modified sensor data. A buffer in base station may be used to temporarily record the modified sensor data when waiting to receive pour event data. The unmatched modified sensor data may be used for other purposes, such as to determine the location of an operator by tracking which base stations are receiving data from the transponders. The unmatched modified sensor data may also be used to locate sensor devices, such as misplaced sensor devices. For example, transponder will send a signal comprising modified sensor data when the transponder is proximate to the misplaced sensor device. The sensor identifier in the signal informs a person to search for the misplaced sensor device in a particular area near the transponder.

FIG. 5 is a flowchart of a method 500 used to reconcile pour event data with ring up data. In several embodiments of the present invention, the matching of pour event data with ring up data is performed by a local computer or a server at an administrative site, which will be collectively referred to as a computer. In 502 computer receives pour event data. The pour event data may contain the modified sensor data. In 504, the computer determines whether the modified sensor data is present. When present the computer begins the matching based on the modified sensor data. In 506, the computer receives the ring up data that also comprises an operator identifier. In 508, the ring up data is matched to the pour event using the operator identifier. Additionally, the time difference between the ring up data and pour event or volume difference between the ring up data and pour event may also be used when matching in 508. Multiple pour events may be matched to a single ring up in 508. Any unmatched ring ups or pour events are flagged as unmatched data 510 and stored for a later audit. When a match is found, the computer in 512 records the match between the ring up data and pour event. The match is stored in a database and may be used for inventory monitoring and tracking. The process may repeat for the additional pour events received by computer.

Returning to 504, when the pour event data is not matched to modified sensor data, computer proceeds with matching without using an operator identifier. In 514, the computer receives the ring up data. In 508, the ring up data is matched to the pour event using a matching scheme that does not involve operator identifier, such as the time difference between the ring up data and the pour event, beverage brand, or volume difference between the ring up data and pour event. Multiple pour events may be matched to a single ring up data in 514. Any unmatched ring ups or pour events are flagged as unmatched data 510 and stored for a later audit. When a match is found, the computer in 518 records the match between the ring up data and pour event. The process may repeat for the additional pour events that do not have an operator identifier.

FIG. 6 is a flowchart of a method 600 used to handle multiple responding transponders to the sensor data. In several embodiments of the present invention, the sensor device emits a signal having a range of less than 4 feet. In some operations, multiple transponders may be proximate or situated within this predetermined range and method 600 processes modified sensor data from such multiple transponders. Similar to FIG. 3, sensor device transmits at a predetermined interval a signal containing sensor data in 602. In 604, any transponders that are within range of sensor device will receive the signal. If no transponder is found, the signal continues to transmit signals until transponders are in range. Once in range, each transponder modifies the sensor data by adding an identifier in 606. This modified sensor data is transmitted by transponder in 608 to a base station, as well as pour event data. Prior to matching modified sensor data to pour event, base station checks to determine the number of modified signals with the same sensor identifier for each of the pour event data. In 610, if the number of modified signals is one, then the process continues in 612 and proceeds with the method shown in FIG. 3. However, when there are two or more modified signals for each pour event data, the base station matches each of the modified signal to the same pour event data in 614 and creates a number of pour events equal to the received modified signal. The process continues using multiple pour events.

In a second aspect of the present invention, method 700 of FIG. 7 is provided in one embodiment. Method 700 uses a sensor device that transmits sensor data once activated. In 702, when a tilt is detected the sensor device is activated in 704. When no tilt condition is detected, method 700 returns without activating sensor device. In 704, an activated sensor device transmits sensor data in 706. The signal sent in 706 typically has a relatively weak range of less than 4 feet. In 708, method 700 detects if any transponders are situated in this predetermined range. A transponder that is situated in predetermined range will modified signal in 710 based on at least one characteristic of the transponder, such as by adding for example at least an identifier. In 712, the modified sensor data signal is transmitted. While steps 706-712 are being processed, sensor devices may be gathering information related to a pour event. In 714, the information of the pour event is sent. If no modified sensor data is received from a transponder, the process determines that no transponders in 708 were in range and in 716 flags that no proximate transponders were present.

In 718, method 700 matches the modified signal to pour event data. When there is a flag of no proximate data, 718 is skipped. Pour events from 718 are sent to a server or other computer for matching with the ring up data in 720. When ring up data comprises an operator identifier, the matching may be done at least based on operator identifier. Additionally, the time difference or volume difference may also be considered when matching pour events to ring up data. When pour events are matched to ring up data, the matched data is stored in a database. Unmatched data from 720 may be stored to be audited at a later time by the administrative site.

In one embodiment, matching pour event data to modified sensor data in 718 is performed by a base station, while matching pour events to ring up data in 720 is performed by an administrative server at an administrative site.

Similar to the method shown in FIG. 3, the ID proximity monitoring method of FIG. 7 may also be combined with the additional methods shown in FIGS. 4-6.

In a third aspect of the present invention there is provided embodiments that may identify the nearest or proximate employee to a dispensing apparatus/container, i.e. bottle, handle or spigot, or other inventory item. The system identifies the employee moving an inventory item and/or pouring a drink through a wireless ID Requester link from a device attached to the inventory item and/or dispensing apparatus/container, which when moved/tilted requests the nearest ID handshake. Since the employee dispensing or reaching for an inventory item will be the closest to the ID Requester, that employee's RFID will respond. A RFID is attached to the clothing of an employee. The employee may be a bartender, waiter, server, etc. RFID may also be in a bracelet, necklace, lanyard, hat, name tag, button, etc. that employee wears. When bottle is titled to pour a beverage into a cup, the ID requesting device (ID requester) attached to bottle is activated and sends a request signal. RFID detects request signal and sends a response signal to complete the ID handshake. RFID may have an unique identifier code that is sent in response to the request signal and stored in ID requester, so that the sensor device knows which employee poured the bottle. ID requester may send the data of which employee dispensed the pour, along with dispensing information, to a POS reconciliation system. Stationary ID requesters may help determine where an employee is located in the establishment.

In some embodiments, where two RFIDs of different employees respond to the ID requester, the ID requester will continuously ping for the closest RFID until the closest RFID becomes evident to the software processing the data.

The system may also use stationary ID requesters to help determine where an employee is to help determine who actually moved an item or poured/dispensed a beverage. The system may also track the location of an employee or items as they are moved from one place to another through a peppered network of stationary ID requesters.

The RFID worn by the employee may in a further embodiment, include a display and lights and sound, to present data and alerts.

The ID requester may be attached to other inventory items, such as boxes containing bottles. In addition, the ID requester may also be attached to a scale, such as the scales shown in U.S. Pat. No. 4,961,533 and U.S. patent application Ser. No. 11/428,448, filed Jul. 3, 2006, the entire contents and disclosures of which are hereby incorporated by reference. For example when using such a scale the ID requester may request the nearest ID handshake when the scale detects a change in weight either in combination with or without using a motion or tilt sensor. Alternatively, a scanner or camera on the scale may active the ID requester to request the nearest ID handshake once the bottle is placed on or near the scale.

The data gathered by the ID requesters and stationary ID may be used in reconciling other data gathered by a beverage monitoring system. For example, once the identity of the employee is matched to the dispense event, the POS reconciliation system may accurately reconcile the dispense event with POS ring ups made by that employee. This may allow the system to determine which employee did not ring up a drink, or who over poured the drink. Embodiments of the present invention provide an advantage in that the employee who is dispensing a beverage may be determined automatically, without any further manual inputs or assignment of sensor devices to an employee. Such an automatic determination may help reduce number of data that must be reconciled by the POS reconciliation system.

All documents, patents, journal articles and other materials cited in the present application are hereby incorporated by reference.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for monitoring beverage dispensing from a container, the method comprising the steps of:
    transmitting an identifier of a sensor device attached to the container,
    receiving the identifier of the sensor device by at least one transponder, wherein the at least one transponder is not attached to the container;
    modifying the received identifier by adding a personal identifier of the at least one transponder to produce modified sensor data;
    transmitting the modified sensor data from the at least one transponder to a base station, wherein the at least one transponder only transmits the modified sensor data, wherein the base station receives a plurality of transmitted modified sensor data;
    generating pour event data by the sensor device, when the container is dispensing a beverage;
    transmitting the pour event data from the sensor device to the base station; and
    matching one of the plurality of the modified sensor data received from the at least one transponder with the pour event data to determine a pour event, wherein the pour event data is different than the modified sensor data;
    wherein the pour event data comprises one or more of the data from the group consisting of tilt time of the sensor device, motion time of the sensor device, duration of motion of the sensor device, duration of tilt of the sensor device, the identifier of the sensor device, transmission timestamp of the pour event data, brand of the container, volume of the beverage dispense and calculated volume amount.

2. The method of claim 1, wherein the at least one transponder is removably attached to an operator.

3. The method of claim 1, wherein the at least one transponder is attached to a bar station.

4. The method of claim 1, further comprising detecting a tilt of the container using the sensor device.

5. The method of claim 1, wherein the sensor data is transmitted after the beverage is dispensed.

6. The method of claim 1, further comprising:
    entering ring up data in a point-of-sale device;
    matching the pour event with the ring up data.

* * * * *